Patented June 9, 1936

2,043,257

UNITED STATES PATENT OFFICE 2,043,257

PRESERVATION OF CHLORINATED HYDROCARBONS

Edmund C. Missbach, Berkeley, Calif., assignor to Stauffer Chemical Company, a corporation of California No Drawing. Application October 9, 1933, Serial No. 692,819

6 Claims. (Cl. 23—250)

This invention relates to the prevention of decomposition of halogenated hydrocarbon compounds, particularly chlorinated aliphatic hydrocarbons, and to the prevention of corrosion by these compounds. It is known that these materials when exposed to moisture, light, air, and heat, particularly during distillation, as in the case of carbon tetrachloride, decompose with the formation of substances of an objectionable character, usually acidic substances which render the material unsuitable for such purposes as extractions as well as corroding equipment. The decomposition I attribute to hydrolysis and liberation of acid or acid bodies which also catalyze the decomposition.

Examples of materials with which the present invention is concerned are carbon tetrachloride, $CCl_4$, chloroform, $CHCl_3$, trichlorethylene, $C_2HCl_3$, tetrachlorethylene, $C_2Cl_4$, pentachlorethylene, $C_2HCl_5$, and the like. Generally, it is concerned with chlorinated and brominated derivatives of methane, ethane, and higher paraffins, as well as ethylene and higher homologues thereof.

The object of this invention is to provide an effective stabilizer for chlorinated hydrocarbons which need be used only in relatively small concentrations.

Another object of this invention is to provide an effective corrosion inhibitor for use in the presence of halogenated hydrocarbons.

I have found that numerous compounds which I class generally as ammonium bases as the amines, imines, amides, imides, and hydrazines, are effective stabilizers and corrosion inhibitors for these materials. Of course, one inhibitor may not be practical for reasons other than its corrosion inhibiting properties and choice must be exercised to the end in view. For example, an inhibitor in carbon tetrachloride to be used in dry cleaning clothes must not deleteriously affect fabrics to be cleaned or alter the color thereof.

The corrosion inhibitor used need only be present in a relatively small concentration and compounds of relatively low solubility in the halogenated hydrocarbon have been used effectively. In some cases, where it is desired to use relatively large quantities of the inhibitor, and where the water solubility of the corrosion inhibitor is relatively greater than its solubility in the compound, the inhibitor may be introduced in the form of an aqueous solution. Such a mixture is effective particularly during distillation, by stabilizing the halogenated hydrocarbon in its liquid state as well as in the vapor phase, a sufficient amount of the inhibitor being volatile with the water vapor.

In cases where the solubility of the corrosion inhibitor in the halogenated hydrocarbon compound is relatively very small, it has been found that the efficiency of these particular inhibitors is so great, that only very small quantities of same are required to stabilize the halogenated hydrocarbon compound to the extent demanded in practice. If it is desired to apply larger proportional amounts of an inhibitor of a solid type, it is reduced to a fine powder, and suspended in the halogenated hydrocarbon, which procedure is especially advisable in case of recovering the halogenated hydrocarbon by distillation.

In some other cases, where it is desired to increase the concentration of the inhibitor above its solubility in the halogenated compound, it is dissolved in a solvent compound miscible with the halogen compound and then incorporated. As suitable solvents, I have used the following compounds: ethylal, methylal, n-butyl alcohol, n-propyl alcohol, methyl ethyl ketone, allyl alcohol allylethyl ether, methyl carbonate, ethyl carbonate, ethyl œnanthate, beta dimethylamino-ethyl alcohol, n-heptaldehyde, and polymerized castor oil. In the case of polymerized castor oil, this material appears to have a metal protecting action and reduces the rate of corrosion apparently by forming a protecting film on the metal.

In all cases, where the corrosion inhibitors mentioned are in the form of solid substances, or are liquids at atmospheric temperatures, and have boiling points considerably higher than that of the halogenated hydrocarbon, they are sufficiently volatile with the water vapor escaping together with the vapor of the halogenated hydrocarbon during distillation. They are therefore not only capable of protecting the latter in the liquid phase, but also in the vapor phase, as have been sufficiently demonstrated by accelerated corrosion tests made in behalf of these corrosion inhibitors, and conducted continuously for a period of 168 hours under reflux in the presence of water, as well as by use for several years under conditions met in practice with carbon tetrachloride.

In order to test the effectiveness of these corrosion inhibitors in connection with halogenated aliphatic hydrocarbons in the presence of water, and to compare the results with those obtained with straight halogenated aliphatic hydrocarbons in presence of water, but without the addition of any corrosion inhibiting substance, I proceeded as follows.

A series of all-glass reflux condensing apparatus was employed, an Erlenmeyer flask of 500 cubic centimeters capacity being attached in each case to the lower end of a Liebig condenser. A glass hook was extended from the condenser into the flask to provide a support for suspending copper bars 2.5 cm. x 9.2 cm. x 0.15 cm. These bars, of a total surface area of practically 50 square centimeters, were provided with a hole near the top so that they could be suspended in a vertical position in a flask out of contact with the bottom. The flasks were charged with a mixture of 150 cubic centimeters of carbon tetrachloride, 133 cubic centimeters of water, and the inhibitor, if any, was added. The bar was then placed in position. The column height of the carbon tetrachloride was very close to 2.54 centimeters as was that of the water layer, so that the bar was about half immersed in the carbon tetrachloride and water, and the remainder was exposed to the vapor of the two liquids after the carbon tetrachloride and water had been brought to a quiet boil.

This method, as can be expected, furnishes only comparative results. However, it is as reliable as any other practical accelerated corrosion test. The expression "Corrosion rate per twenty-four hours per square decimeter" is only empirical, and all comparison tests must be performed for the same length of time.

Copper has been selected as the testing material in connection with carbon tetrachloride and water because this metal is largely used in the construction of distilling apparatus and fire extinguishing apparatus, and also because copper is very susceptible toward the corrosive action of hydrochloric acid.

The carbon tetrachloride employed was of the purity of the regular technical grade. When used, together with water, without the addition of any corrosion inhibiting substance, the copper bar was eaten through and completely cut within the water layer by the hydrochloric acid formed from the carbon tetrachloride by hydrolytic decomposition, within a period of thirty and a half hours, at which time the test was discontinued, the apparatus disconnected, the copper bar removed, washed, and weighed. The corrosion rate was then calculated on the basis of grams of metal lost per 100 square centimeters of metal surface exposed to the liquids as well as to the vapor in twenty-four hours.

In the tests in which my corrosion inhibiting substances had been employed, conditions otherwise remaining identical, the copper bars of known weight, were also removed from their apparatus at about the same time, after approximately thirty and a half hours reflux, washed, dried, and weighed in order to determine the amount of metal lost, if any, during that period, as indicated in the following table. In the last five tests reported in the subsequent table, the copper bars were returned to their respective apparatus and the tests continued until a total period of 168 hours of reflux had been accomplished. The copper bars were then again removed from their apparatus, washed, dried, again weighed, and the amount of copper metal lost per bar in 168 hours determined, this loss of weight in the 168 hours being reported in the last column.

It is to be remarked that a so-called "corrosion rate" for 100 square centimeters in twenty-four hours has not been calculated in these last five cases in order to avoid confusion in comparing the data with the corrosion rate of straight carbon tetrachloride and water obtained from tests conducted for a period of only thirty and one-half hours, because the corrosion rate obtained from these tests does not increase proportionally with the extension of time of reflux, conditions otherwise remaining the same, particularly in cases where no corrosion inhibitor is employed. For example, in one case where straight carbon tetrachloride and water without any inhibitor was tested, a copper strip 2.5 x 9.2 centimeters and of a thickness of only 0.10 centimeters instead of 0.15 centimeters, was cut through within the water layer by the corrosive action of the hydrochloric acid formed by partial decomposition of the carbon tetrachloride after only twenty-seven hours of reflux with a loss of metal amounting to 5.196 grams, corresponding to a corrosion rate of 9.237 grams for a square decimeter in twenty-four hours. This shows that the presence of hydrochloric acid and water in carbon tetrachloride, promotes the decomposition of these materials at a rate out of proportion to the length of time. In this case a time difference of three and one-half hours made a difference in the rate of 5.714 grams per twenty-hour hours.

| Inhibitor used | Reflux—30½ hours | | Reflux 168 hours, total loss grams |
|---|---|---|---|
| | Total loss grams | Rate of loss per 24 hours GMS/DMS² | |
| None | 9.5 | 14.951 | (*) |
| 0.01 g. diethyl-cyanamide | None | None | (*) |
| 0.01 g. dibenzyl-cyanamide | None | None | (*) |
| 0.01 g. a-napthylamine | None | None | (*) |
| 0.25 g. hexamethylene tetramine previously dissolved in 1.5 c. c. n-heptaldehyde | None | None | (*) |
| 0.01 g. ethyl cyanide | None | None | (*) |
| 0.01 g. benzalazine | None | None | (*) |
| 0.10 g. dibenzyl cyanamide | None | None | 0.016 |
| 0.25 g. thiosinamine dissolved in methyl ethyl ketone (:1.5 g.) | None | None | 0.033 |
| 0.5 g. diphenylamine | None | None | 0.026 |
| 0.5 g. a-napthylamine | None | None | 0.028 |
| 0.5 g. hexamethylene tetramine dissolved in n-heptaldehyde (1.5 c. c.) and 3 c. c. polymerized castor oil | None | None | 0.058 |

* Test not carried out to this extent.

I have found that nitrogen containing compounds, particularly those derived from ammonia, including the amines and the cyanamides in particular, are effective corrosion inhibitors when used as I have mentioned previously. Aliphatic, carbocyclic and heterocyclic compounds are included and the derivatives comprise amines, amides, hydrazines, and cyanides, as well as others that will appear in the following detailed disclosure.

I have found that substituted ammonias, particularly ammonia bases or materials forming these on decomposition, are effective inhibitors. These materials include amino derivatives of normal monohydric saturated alcohols as well as those of isomeric propyl, butyl and amyl alcohols, as: primary amines ($R.NH_2$), secondary amines ($R_2.NH$), tertiary amines ($R_3.N$). As examples of these are mentioned the primary, secondary, and tertiary methyl, ethyl, n-propyl, iso-propyl, n-butyl, n-octyl, and amyl-amines, including mixed amines as methyl-propylamine, methyl-ethyl-propylamine and the like.

As other bases can be mentioned the hydroxylamines, as the methyl- and ethyl-hydroxylamines and hydrazines derived from diamide or hydrazines derived from diamide or hydrazine and including methyl-, ethyl-, and diethyl-hydrazine, and tetra-ethyl-tetrazine.

Derivatives of aldehydes and ketones are also useful. These include the aldehyde ammonias, products of aldehydes and ammonias including such combinations as aldehyde ammonia, heptaldehyde ammonia, and condensation products as hexamethylene tetramine, and derivatives thereof including chloral- and mentholhexamethylene tetramine. Hydrazine-ketone reaction products as acetone-hydrazone are also useful and amino derivatives of a monobasic acid are useful as acetyl methyl amine. Amines of dihydric alcohols as hydroxy ethylamine, ethylene diamine, diethylene diamine, tetramethylene-diamine, and pentamethylene diamine, are included.

Cyanamide and derivatives thereof are particularly useful. These include sodium and calcium cyanamide, di-sodium cyanamide, monoalkyl derivatives as ethyl, methyl, iso-propyl, n-butyl, and allyl cyanamide, dialkyl derivatives as diethyl, dimethyl, di-n-butyl, dipropyl, diallyl, and diamyl cyanamide, and dicyandiamide, dicyandiamidine, the melames, melamine guanidine and guanidines as dimethylguanidine, diphenyl-ethyl-guanidine, ethylene guanidine and propylene guanidine, diphenylguanidine and formylguanidine, diguanide, melam, the ammelines and ammelides and derivatives thereof. Mixed alkyl-aryl compounds as methyl-phenylcyanamide and other compounds as dibenzyl- and piperidine-cyanamide, cyanbenzene, benzylcyanid, cyananiline, cyanuric acid, ethylcyanurate and ethyl isocyanurate are included as are the nitriles including such representatives as methyl-, ethyl-, and n-butyl cyanide.

Amides of carbonic acid, normal and acid, as carbamide (urea) and carbamic acid, and derivatives of imido-carbonic acid, and the amidine of carbonic acid, guanidine, are included as are urethane, ethyl-imido-dicarboxylate, biuret, diurea, semi-carbazide or semi-hydrocarbazide, as well as o-phenetyl urea.

Alkylated ureas are also included as the methyl-, ethyl-, and sym.-diethyl, and unsym.-diethyl ureas.

Purine, a complex cyclic diureide is included.

Sulphur derivatives of carbonic acid as thiourea are included as are derivatives of thio-urea corresponding to those of urea as thiosinamine.

Amidines of carbonic acid as guanidine and its derivatives, guanidine carbonate, amino-guanidine, as well as glycocyamine, glycocyamidine, creatine and creatinime are included.

The amino derivatives of benzene and its homologues, aromatic bases—arylamines are also useful, including primary, secondary, and tertiary amines.

As primary monamines are mentioned aniline, as well as higher homologues of aniline including o-, m-, and p-toluidine, and the xylidines, mesidine, pseudo-cumidine, the methyl-, dimethyl-, ethyl- and diethyl aniline.

Secondary monamines as pure aromatic secondary amines as diphenylamine and derivatives thereof, as well as mixed secondary bases containing both an alkyl and an aryl group as methylaniline, ethylaniline, and methyl diphenyl amine, are included.

Pure (triarylamines) aromatic or mixed (alkyl-aryl amines) tertiary monamines as triphenyl amine, methyl ethylaniline, benzyl phenyl hydrazine, dimethyl aniline, and diethyl aniline are included.

Polyamino derivatives, diamines, and triamines, etcetera, as phenylene-diamine, ethylidine-diphenyl diamine, p-amino-dimethyl aniline, tolylene diamine, and tetramino benzine, are included.

Formanilide, an acyl derivative of an arylamine, is also useful.

Benzylamine, mono-, di- and tri-, mentioned as primary amines with the amino group in the side chain, are included, as well as betaphenyl ethylamine and benzyl aniline.

Aromatic hydrazines corresponding with those of the aliphatic series—these include phenyl hydrazine, s-diphenyl hydrazine, uns.-diphenyl hydrazine, phenyl methylhydrazine, and tertiary-hydrazines as triphenyl hydrazine.

Amino substitution products of aromatic aldehydes are included as benzoyl formaldehyde hydrazone.

Aromatic acid derivatives as benzamide, benzanilide, thiobenzamide, benzyl hydrazine, amino benzamide, benzamidine and phthalamide, are included.

Aromatic compounds containing two or more benzene nuclei as benzidine and carbazole, o-tolidine dianisidine and dimethoxy-benzidine are included, as are amines of the diphenyl-methanes as diamino-diphenyl-methane and tetra-methyl-diamino-methane.

Condensed benzene nuclei compounds include the naphthylamines, the several tetrahydronaphthylamines, methyl-, dimethyl-, and phenyl-amines, the naphthylene diamines.

Complex pyridine-aldehyde products as pyridine formaldehyde and other pyridine derivatives as piperidine are also useful.

The foregoing materials can all be classed as organic bases as well as substituted ammonias wherein the hydrogen of the ammonia has been replaced in whole or in part by some element other than nitrogen or by some radical other than one including a double bond nitrogen to nitrogen linkage as in the diazonium salts and azo dyes. The term "substituted ammonia" is not used as including azo compounds containing a double nitrogen to nitrogen linkage.

The stabilizing effect and inhibiting action in corrosion of my inhibitor toward decomposition of the halogen content is, I believe, accomplished in one or all of these ways. Firstly, they neutralize or remove any acid or acidic substances present; secondly, they retard the production of acid; thirdly, they form a protective film on the surface of the metal.

This invention, however, is not limited to the use of a single substance or compound mentioned herein, or which are related to their respective class or groups, but I may also employ two or more of these substances in combination with each other, in connection with the stabilization of halogenated hydrocarbons, or I may use a substance which forms a part of certain compounds mentioned herein.

For example I wish to mention, that I may combine, or use various mixtures as of alkylamines, hydrazines, hydroxyl-amines, or any of these substances which have a strongly basic reaction, with an arylamine, but particularly with a secondary aromatic amine.

Strongly basic substances such as aliphatic amines, hydrazines, and hydroxylamines are here included because of their ability to neutralize any acid or acidic substance present, and to retard the formation of acid. However, it is understood that if these substances produce undesirable effects, they may be used in combination with other substances, as aldehydes, e. g. formaldehyde or its polymers, benzaldehyde, heptaldehyde and the like, or ketones, benzil, dibenzyl, benzoyl-acetone, or organic acids, particularly higher fatty acids, as adipic acid, abietic acid, malonic acid, palmitic acid, stearic acid, myristic acid, heptoic acid, nonilic acid, particularly in cases in which the inhibitor has a strongly basic character.

The tests of materials hereinbefore set forth are by way of example only, and are not to be taken as limiting the invention which includes the use of all of those compounds disclosed, as inhibitors for decomposition and corrosion, as well as materials which are merely higher homologues, or derivatives, or substitution products of the disclosed inhibiting compounds.

By stabilizing amount I mean an amount of less than about 1% and only sufficient to stabilize the carbon tetrachloride.

I claim:
1. Carbon tetrachloride containing a stabilizing amount of an alkyl cyanamide.
2. Carbon tetrachloride containing a stabilizing amount of a cyanamide.
3. Carbon tetrachloride containing a stabilizing amount of an amide of cyanic acid.
4. The method of stabilizing carbon tetrachloride comprising adding thereto a stabilizing amount of an alkyl cyanamide.
5. Carbon tetrachloride containing a stabilizing amount of diethyl cyanamide.
6. Carbon tetrachloride containing a stabilizing amount of dibenzyl cyanamide.

EDMUND C. MISSBACH.